Oct. 15, 1957
D. W. RAU
2,809,731
MAGNETIC PARTICLE COUPLING DEVICE WITH
NICKEL-COATED IRON PARTICLES
Filed Nov. 16, 1950
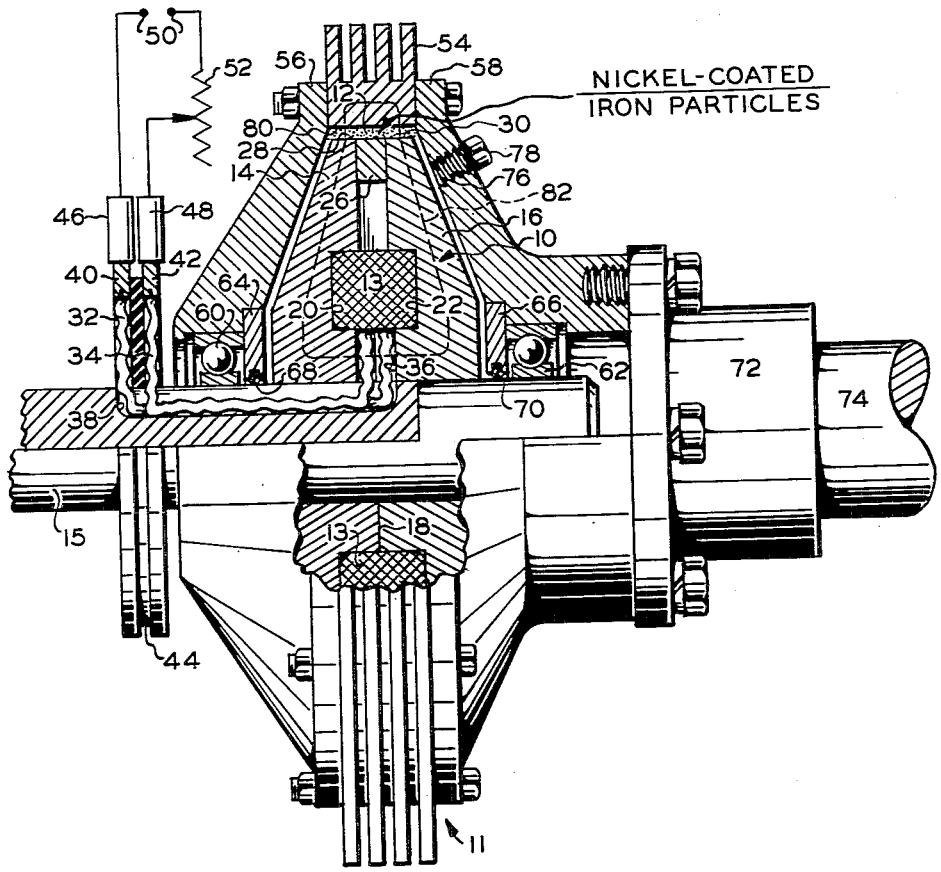
INVENTOR.
DAVID W. RAU
BY
ATTORNEY

United States Patent Office 2,809,731
Patented Oct. 15, 1957

2,809,731

MAGNETIC PARTICLE COUPLING DEVICE WITH NICKEL-COATED IRON PARTICLES

David W. Rau, Kirkwood, Mo., assignor to Vickers Incorporated, Detroit, Mich., a corporation of Michigan Application November 16, 1950, Serial No. 196,058

4 Claims. (Cl. 192—21.5)

This invention relates to power transmission and more particularly to power transmission by magnetic coupling through the medium of magnetic particles.

The invention herein is concerned with the type of magnetic coupling provided between two relatively movable spaced coupling members separated by a magnetizable gap in which magnetic particles act to transmit mechanical force between the coupling members when the gap material (magnetic particles) is magnetically excited. Magnetic clutches, brakes, drives, etc., are examples of this type of magnetic coupling.

Since one of the limiting factors of any coupling device, such as a clutch, brake, or drive, is the amount of heat it can successfully dissipate, it is desirable that material in the gap of a magnetic coupling device have a high thermal conductivity in order to effectively transfer heat across the gap to the exterior of the device. Other characteristics desirable to have in a gap material are as follows: smooth application and transmission of force; reasonably high permeability in order to transmit force with the least amount of control current; resistance to packing and sintering, either of which may prevent power transmission or cause the coupling members to seize, depending on the volume of the gap material; and chemical and magnetic stability over a reasonable period of time.

Prior to the invention herein, iron particles were the only magnetic particles which achieved any practical success as gap material in magnetic coupling devices. Iron particles, known commercially as Carbonyl E, which are spongy particles of the order of eight microns, have been extensively used in such devices. However, iron particles alone cannot be used in magnetic coupling devices because they pack and sinter after a short time. For example, in a clutch iron particles alone, such as Carbonyl E without any additive, produce high initial torque for only a short time before the particles sinter or pack into a mass which will cause either complete failure of torque transmission or locking of the coupling members. What happens depends largely on the proportion of the gap material to the gap volume.

Mixtures of iron particles with either liquids or solid lubricants, such as graphite, have been proposed and have achieved a certain degree of success. Liquid mixtures or suspensions of iron particles transmit less force than the same volume of iron particles alone, and in rotary applications packing is often caused by centrifuging. In addition drag or creeping and the problems of liquid sealing must be contended with. Mixes of iron particles and graphite likewise apply and transmit less force than iron particles alone, and since graphite has a low thermal conductivity the heat transfer across the gap is poor. Liquid and solid lubricants being nonmagnetic, do not have any inherent force transmitting qualities responsive to magnetic fields.

The present invention proposes to utilize the advantages of iron particles as a gap material while at the same time preventing the packing and the sintering of iron particles without the necessity of forming mixtures with liquid or solid lubricants. This is accomplished according to the invention by coating the iron particles, which are readily oxidizable, with a less readily oxidizable magnetic material such as nickel. Nickel-coated iron particles employed as gap material in magnetic coupling devices do not sinter or pack under operating conditions of such devices.

This invention therefore embraces the use of iron particles protectively coated with a less readily oxidizable magnetic material, such as nickel, as gap material in connection with magnetic coupling devices.

An object of this invention is to provide a new and useful magnetic coupling device wherein the gap material has substantially the following characteristics: reasonable permeability to allow effective application and transmission of force with reasonable magnetic excitation; resistance to sintering and packing under operating conditions; high thermal conductivity; freedom from sealing problems like those encountered with liquid mixtures; chemical and mechanical stability for a reasonably long period of time.

Further objects and advantages of the present invention will be apparent from the following description, reference being had to the accompanying drawing wherein a preferred form of the present invention is clearly shown.

In the drawing:

The single figure in the drawing is a view, partly in cross section, illustrating the use of the invention as embodied in an electro-magnetic clutch.

Within the sphere of the invention the coupling members may adopt various forms of construction; the gaps therebetween may be single or compound and of any suitable form, e. g. in rotary applications the gaps may be radial, axial, or combinations of both; the magnetic excitation across the gaps between the coupling members may be provided in a variety of ways, such as fixed magnets with or without variable shunt control, current carrying magnetizing coils etc., any of which may be carried by any of the coupling members, by a yoke independent of the coupling members, or any other suitable manner; and any of the coupling members may be employed either as force transmitting or force receiving members.

In accordance with one embodiment of the invention, shown in the drawing by way of example and not as limiting the invention or the scope thereof, a magnetic clutch includes a pair of relatively movable coupling members 10 and 11 separated by a magnetizable air gap 12 in which is disposed a quantity of nickel-coated iron particles as indicated by the legend in the drawing. Magnetic excitation between the members 10 and 11 across the gap 12 is provided by magnetizing coil 13 carried by the members 10 as later described. The member 10 which is completely surrounded by the member 11 is fixed to a shaft 15 and includes a magnetic yoke made of two disks 14 and 16 made of suitable magnetic material, for example, steel or iron. Central sections of the disk surrounding shaft 15 abut each other as indicated at 18 to form a low reluctance joint, and annular grooves 20 and 22 are formed in the disks to receive a magnetizing coil 13.

The disks are spaced apart from their outer diameter to the grooves 20 and 22, and the gap between them is sealed by a non-magnetic ring spacer 26 flush with the peripheral surfaces 28 and 30 of the disks, which surfaces are the pole faces of the magnetic yoke. It will be seen from the figure that the cross section of the yoke is generally U-shaped, the "legs" being the spaced sides of the disks 14 and 16 whose abutting sections form the base of the U. Thus, when the yoke is magnetized upon energization of the coil, an infinite number of horse-shoe magnets form a volume of revolution around the shaft 15.

Leads 32 and 34 from the coil 13 are brought out through a small opening 36 at the joint 18 and an axial slot 38 in the shaft 15, and are connected to a pair of slip rings 40 and 42 mounted on an insulator disk 44 fixed to rotate with the shaft 15. A pair of brushes 46 and 48 contacting the rings 40 and 42, respectively, may be connected to a suitable source 50 of control current through a rheostat 52. The path of control current to the magnetizing coil 24 is obvious from the figure.

The member 11 includes a finned ring 54 formed from suitable magnetic material, such as iron, and carried by non-magnetic end bells 56 and 58 mounted on ball bearings 60 and 62 for rotation around the shaft 15. Bearing retaining rings 64 and 66 may be provided with suitable seals 68 and 70 to prevent the escape of magnetic particles from the clutch interior to the bearings. A flanged union 72 secured to the end bell 58 provides coupling means to shaft 74 which may be keyed to the union 72 in any suitable manner. A suitable filler hole 76 and plug 78 are provided in the end bell 58 to permit the introduction of the magnetic particles into the interior of the clutch.

Either of the members 10 and 11 may be interchangeably employed as a driver or a driven member, for example if the inner member 10 is connected through shaft 15 to a prime mover, then the outer member 11, together with the shaft 74, become the output members of the clutch. Suitable labyrinth mazes or baffles may be provided if desired between the coupling members to prevent the gap material from falling or working toward shaft portions of the apparatus and to keep the particles close to the gap when the members are at standstill or at slow speed and the coil 13 is de-energized.

The protective coating of a less readily oxidizable magnetic metal, preferably nickel, may be applied to the iron particles in any suitable manner, for example by plating. One plating method which was used to coat nickel on iron particles employed in the practice of the present invention is known as the Electroless plating method.

Various particle sizes may be employed successfully; for example, particular success was achieved with particle sizes less than 200 microns. Although all types of magnetic iron particles are embraced by the invention, magnetic iron known commercially as Carbonyl L, whose particles are of the order of 20 microns, is a preferred form. The type of duty and the nature of the coupling device are factors which are necessarily considered in determining the size of the particles and the quantity thereof with relation to the gap volume that will be used.

When the coil 13 is energized by current, a magnetic field is established between the peripheral surfaces 28 and 30 of the magnetic yoke and the inner surface 80 of the magnetic ring 54. The magnetic path is indicated by the dotted line 82 which traverses the air gap through the magnetic particles. The nickel-coated iron particles and the magnetic members 14, 16, and 54 become magnetized when the magnetic field is established and the magnetized particles bind the driving and the driven member together to an extent dependent on the strength of the field and the load. Operative ranges from 100% slip to zero slip (synchronous operation) between the coupling members is available through control of the magnetic excitation. For use as a brake, one of the movable members may be held rigid. For example, the member with the coil may be stationary and utilized to brake the rotating member 11.

Magnetic particle clutches employing magnetic particles coated with a less readily oxidizable magnetic material have been successfully operated continuously for many hours without sintering, packing, wear, or deterioration of the magnetic stability taking place.

Although, only one embodiment has been illustrated, the invention is applicable wherever a magnetic coupling is required between spaced magnetic members, such as magnetic clutches, brakes, etc. Further, the invention is not confined to rotating machinery but is equally adaptable as a coupling between magnetic members, relatively movable in other than rotative paths, for example rectilinear motion, etc.

While the form of embodiment of the invention as herein disclosed constitutes a preferred form, it is to be understood that other forms might be adopted, all coming within the scope of the claims which follow.

What is claimed is as follows:

1. A magnetic coupling device comprising a pair of spaced relatively movable coupling members defining a gap therebetween, means for establishing a magnetic field across said gap, and unlubricated nickel-coated iron particles in said gap and responsive to said field for establishing a force transmitting bond between said members, whereby movement of one member at least tends to cause movement of the other member.

2. A magnetic coupling device comprising a pair of spaced relatively rotatable coupling members defining a gap therebetween, means for establishing a magnetic field across said gap, and unlubricated nickel-coated iron particles in said gap and responsive to said field for establishing a force-transmitting bond between said members, whereby rotation of one member at least tends to cause rotation of the other member.

3. A magnetic coupling device comprising a pair of spaced relatively movable coupling members defining a gap therebetween, means for establishing a magnetic field between said members at said gap, unlubricated iron particles in said gap and responsive to said field for establishing a force-transmitting bond between said members, whereby movement of one member at least tends to cause movement of the other member, said iron particles being substantially completely coated with nickel.

4. A magnetic coupling device comprising a pair of spaced relatively rotatable coupling members defining a gap therebetween, means for establishing a magnetic field between said members at said gap, and unlubricated iron particles in said gap and responsive to said field for establishing a force-transmitting bond between said members, whereby rotation of one member at least tends to cause rotation of the other member, said iron particles being substantially completely coated with nickel.

References Cited in the file of this patent

UNITED STATES PATENTS

| 811,654 | Murphy | Feb. 6, 1906 |
| 1,986,197 | Harshaw | Jan. 1, 1935 |
| 2,525,571 | Winther | Oct. 10, 1950 |
| 2,519,449 | Findley | Aug. 22, 1950 |
| 2,575,360 | Rabinow | Nov. 20, 1951 |
| 2,629,471 | Rabinow | Feb. 24, 1953 |

FOREIGN PATENTS

| 261,748 | Switzerland | Sept. 1, 1949 |

OTHER REFERENCES

Magnetic Clutch Holds M. P. A. Interest, Chemical and Engineering News, vol. 27, No. 17, April 25, 1949 (p. 1213).

Technical Report 1213, National Bureau of Standards, Washington, D. C. Copy received in Div. 68, U. S. P. O. on March 30, 1948.